US012129701B2

(12) United States Patent
Meyer

(10) Patent No.: US 12,129,701 B2
(45) Date of Patent: Oct. 29, 2024

(54) LOW PROFILE CRANK HANDLE ASSEMBLY FOR FENESTRATION UNIT

(71) Applicant: JELD-WEN, Inc., Charlotte, NC (US)

(72) Inventor: Shane Michael Meyer, Klamath Falls, OR (US)

(73) Assignee: JELD-WEN, Inc.

( * ) Notice: Subject to any disclaimer, the term of this patent is extended or adjusted under 35 U.S.C. 154(b) by 339 days.

(21) Appl. No.: 17/648,599

(22) Filed: Jan. 21, 2022

(65) Prior Publication Data

US 2023/0235608 A1 Jul. 27, 2023

(51) Int. Cl.
*E05F 11/02* (2006.01)
*E05F 11/10* (2006.01)

(52) U.S. Cl.
CPC .............. *E05F 11/02* (2013.01); *E05F 11/10* (2013.01)

(58) Field of Classification Search
CPC . E05F 11/02; E05F 11/10; E05F 11/16; E05F 11/34; Y10T 292/57; Y10T 292/282; Y10T 74/20744; Y10T 74/20756
See application file for complete search history.

(56) References Cited

U.S. PATENT DOCUMENTS 3,007,348 A * 11/1961 Barnes ................... G05G 1/085 74/543
5,219,195 A 6/1993 Lawrence
5,400,473 A * 3/1995 Delman .................. E05F 11/16 74/545
5,410,778 A * 5/1995 Langevin ................ E05F 11/10 74/545
5,551,316 A 9/1996 Blank
6,375,382 B1 * 4/2002 Clavet ..................... E05F 11/16 403/362
D522,837 S 6/2006 Vetter et al.
7,251,860 B2 * 8/2007 Liang ...................... E05F 11/16 74/547
D591,146 S 4/2009 Dallmann et al.
D595,110 S 6/2009 Berstler et al.

(Continued)

FOREIGN PATENT DOCUMENTS

WO 2018231549 A1 12/2018

OTHER PUBLICATIONS

Marvn Modem Awning, https://web.archive.org/web/20200407084818/https://www.marvin.com/products/collections/signature/modern/awning.

(Continued)

*Primary Examiner* — Justin B Rephann
(74) *Attorney, Agent, or Firm* — Lorenz & Kopf LLP

(57) ABSTRACT

A crank handle assembly for actuating a panel of a fenestration unit relative to a frame includes an arm. The arm is elongate and is configured to be supported at one end by the frame for rotation to actuate the moveable panel relative to the frame. The crank handle assembly also includes a knob that is moveably attached to an opposite end of the arm and that extends therefrom. The knob is supported for movement between an aligned position and a misaligned position relative to the arm. The arm and the knob cooperatively define a crank handle longitudinal axis. The knob, in the aligned position, is aligned with the arm and the crank handle longitudinal axis is straight. The knob, in the misaligned position, is misaligned with the arm, and the crank handle longitudinal axis is nonlinear.

19 Claims, 5 Drawing Sheets

(56) References Cited

U.S. PATENT DOCUMENTS

| | | | | |
|---|---|---|---|---|
| D780,555 | S | 3/2017 | Vetter | |
| D818,798 | S | 5/2018 | Black et al. | |
| D874,901 | S | 2/2020 | Vetter et al. | |
| D895,414 | S | 9/2020 | Woodward et al. | |
| 10,760,317 | B2 * | 9/2020 | Guelck | E05C 17/24 |
| 11,808,073 | B2 * | 11/2023 | Hollermann | E05F 11/02 |
| 2002/0066162 | A1 * | 6/2002 | Klompenburg | E05F 11/34 16/429 |
| 2004/0183314 | A1 * | 9/2004 | Klompenburg | E05F 11/16 292/263 |
| 2004/0216381 | A1 * | 11/2004 | Clavet | E05F 11/10 49/342 |
| 2005/0212305 | A1 * | 9/2005 | Gill | E05F 11/16 292/336.3 |
| 2007/0273162 | A1 * | 11/2007 | Schultz | E05F 11/34 292/336.3 |
| 2008/0066382 | A1 * | 3/2008 | Erickson | E05B 13/10 49/246 |
| 2008/0256868 | A1 | 10/2008 | Heppner et al. | |
| 2013/0312331 | A1 * | 11/2013 | Bourgoin | E05F 11/10 49/386 |
| 2014/0259940 | A1 * | 9/2014 | Meves | E05F 9/00 49/353 |
| 2019/0383069 | A1 * | 12/2019 | Guelck | E05C 17/24 |
| 2020/0263475 | A1 | 8/2020 | Hollermann | |
| 2022/0341237 | A1 * | 10/2022 | Dallmann | E05F 11/22 |
| 2022/0341238 | A1 * | 10/2022 | Dallmann | E05F 11/22 |

OTHER PUBLICATIONS

Marvin Modem Casing, https://web.archive.org/web/20200407084626/https://www.marvin.com/products/collections/signature/modern/casement.

Marvin Owners Manual, https://www.marvin.com/support/owners-manual.

Marvin Hardware, https://web.archive.org/web/20200924043127/https://www.marvin.com/products/design-options/hardware.

Prime Line, https://www.primeline.net/h-3959-casement-folding-crank-handle.

Elesa Ganter Cranked handles with retractable handle https://www.elesa-ganter.com/ https://www.elesa-ganter.com/2021.

* cited by examiner

LOW PROFILE CRANK HANDLE ASSEMBLY FOR FENESTRATION UNIT

TECHNICAL FIELD

The present disclosure generally relates to a fenestration unit and, more particularly, relates to a low-profile crank handle assembly for a fenestration unit.

BACKGROUND

Various fenestration units include a crank handle for actuating a panel thereof. The crank handle may be moveably attached to the frame, and for many of these types of fenestration units, the crank handle may be manually rotated to move the panel between a closed position and an open position.

However, problems remain. Many crank handles project and/or hang off of the frame. As such, the crank handle may be undesirably conspicuous, bulky, and/or inconveniently positioned. Some crank handles may be lacking in ergonomic functionality. Furthermore, some crank handle assemblies may present manufacturing inefficiencies, may include a high number of parts, and/or may increase manufacturing costs.

Thus, it is desirable to provide an improved crank handle, crank handle assembly, and fenestration unit that is aesthetically pleasing. It is desirable to provide a low-profile, compact, and inconspicuous crank handle that also provides highly ergonomic functionality. It is also desirable to provide improved manufacturing methods for these crank handles, crank handle assemblies, and fenestration units. Other desirable features and characteristics of the present disclosure will become apparent from the subsequent detailed description and the appended claims, taken in conjunction with the accompanying drawings and this background discussion.

BRIEF SUMMARY

This is solved by the subject-matter of the independent claims. Further embodiments are included in the dependent claims.

In one embodiment, a crank handle assembly for actuating a panel of a fenestration unit relative to a frame is disclosed. The crank handle assembly includes an arm (i.e., a first handle part) that is elongate and is configured to be supported at one end by the frame for rotation to actuate the moveable panel relative to the frame. The crank handle assembly also includes a knob (i.e., a second handle part) that is moveably attached to an opposite end of the arm and that extends therefrom. The knob is supported for movement between an aligned position and a misaligned position relative to the arm. The arm and the knob cooperatively define a crank handle longitudinal axis. The knob, in the aligned position, is aligned with the arm and the crank handle longitudinal axis is straight. The knob, in the misaligned position, is misaligned with the arm, and the crank handle longitudinal axis is nonlinear.

In another embodiment, a crank handle assembly for actuating a panel of a fenestration unit relative to a frame is disclosed. The crank handle assembly includes a first handle part that is elongate and axially straight and that is configured to be supported at one end by the frame for rotation about a first axis to move between a stowed position and a deployed position. The one end of the arm is supported for rotation about a second axis to actuate the moveable panel relative to the frame. The handle assembly further includes a second handle part that is rotationally attached to an opposite end of the first handle part at a joint. The joint supports the second handle part for rotational movement between an aligned position and a misaligned position relative to the first handle part. The first and second handle parts cooperatively define a crank handle longitudinal axis. The second handle part, in the aligned position, is aligned with the first handle part and the crank handle longitudinal axis is straight. The second handle part, in the misaligned position, is misaligned with the first handle part and the crank handle longitudinal axis is nonlinear.

In an additional embodiment, a fenestration unit is disclosed that includes a frame and a panel that is supported for movement relative to the frame between a closed position and an open position. The fenestration unit includes a crank handle assembly for selectively actuating the panel between the closed position and the open position. The crank handle assembly includes an arm that is elongate and that is configured to be supported at one end by the frame for rotation to actuate the moveable panel relative to the frame. The crank handle assembly also includes a knob that is moveably attached to an opposite end of the arm and that extends therefrom. The knob is supported for movement between an aligned position and a misaligned position relative to the arm. The arm and the knob cooperatively define a crank handle longitudinal axis. The knob, in the aligned position, is aligned with the arm and the crank handle longitudinal axis is straight. The knob, in the misaligned position, is misaligned with the arm and the crank handle longitudinal axis is nonlinear.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
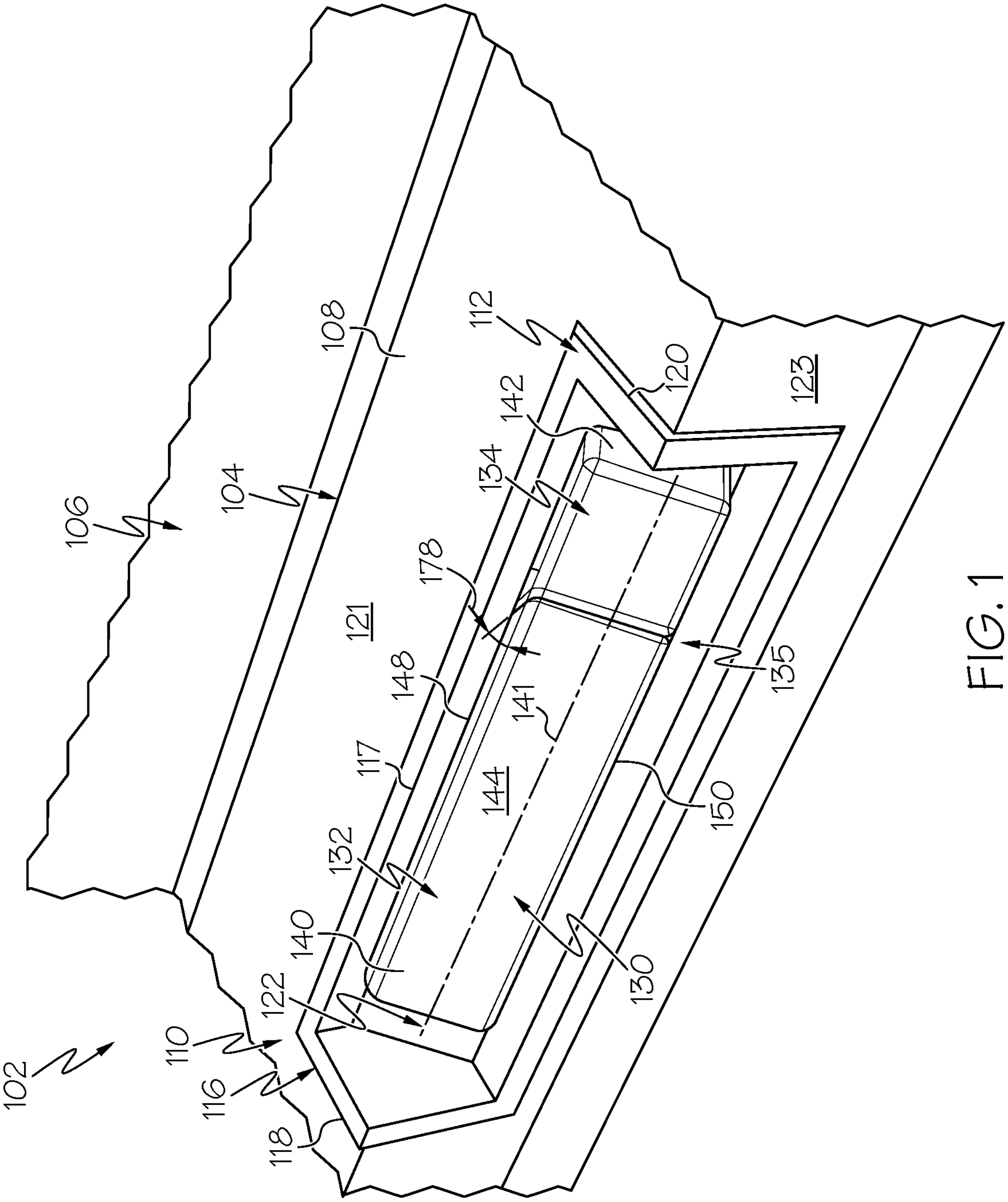
FIG. 1 is a perspective view of a portion of a fenestration unit with a crank handle assembly according to example embodiments of the present disclosure, wherein a crank handle of the assembly is shown in a first position.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved crank handle assembly for a fenestration unit. The crank handle assembly may include a plurality of parts that cooperatively define a crank handle, which extends along an axis. For example, the handle parts may include an arm and a knob that cooperatively define the crank handle and the crank handle axis. The crank handle may also be supported by an escutcheon, which is fixed to the frame. The escutcheon may be inset, recessed, and/or received into a rail of the frame. The escutcheon may define an inset space, pocket, recess, or other receiving space that receives the crank handle. The crank handle may be supported for movement between a stowed position and a deployed position relative to the escutcheon and the frame. In the stowed position, the crank handle may be received within the inset space of the escutcheon and may lie substantially flat therein so as to appear integrated within the frame of the fenestration unit. In the deployed position, the crank handle may extend outward and may project from the inset space and away from the escutcheon and frame of the fenestration unit.

Once deployed, the crank handle may be rotated in a number of directions relative to the frame. The arm of the crank handle may rotate about a first axis relative to the frame to actuate the panel of the fenestration unit. The knob may move relative to the arm of the crank handle to facilitate cranking motion of the handle assembly. To facilitate this motion and to improve ergonomic function of the crank handle, the knob may rotate relative to the arm. As the knob rotates, it may move in and out of alignment with the arm.

The shape, profile, surfaces, and/or other features of the knob may correspond to those of the arm. As such, when the knob is in alignment with the arm, the knob may appear as an extension of the arm. When aligned with the arm, the knob may appear as a projection along a straight longitudinal axis of the crank arm. The knob may be co-linear, may be co-planar, and/or may be coaxial with the arm. Accordingly, the knob may align with the arm, allowing the crank handle to stow away against the escutcheon and frame in a low-profile arrangement. The crank handle may lie flat against the frame. The crank handle assembly may, thus, appear integrated into the frame. Then, when needed, the crank handle may fold up and away from the escutcheon/frame and deployed therefrom for convenient and ergonomic use in actuating the panel. The knob may rotate relative to the arm to facilitate this motion. The crank handle assembly may be stowed back in its low-profile and compact position, appearing integrated into the frame of the fenestration unit.

Manufacturing methods for the crank handle assembly are also disclosed herein. The crank handle assembly may include a relatively low number of parts. These parts may be manufactured efficiently and at reduced costs. The assembly may be manufactured in a repeatable and accurate fashion. Accordingly, the manufacturing methods of the present application provide a number of efficiencies and advantages.

Referring now to FIG. 1, a portion of a fenestration unit 102 is illustrated according to example embodiments of the present disclosure. The fenestration unit 102 may be a window in some embodiments; however, it will be appreciated that the fenestration unit 102 may be a skylight or other type without departing from the scope of the present disclosure. The fenestration unit 102 may include a frame 104 and a panel 106 that is supported by the frame 104 for movement between a closed position and an open position. The panel 106 is shown in the closed position in FIG. 1. The fenestration unit 102 may be a swinging window in some embodiments such that the panel 106 hingeably pivots (e.g., about a vertical axis of rotation) relative to the frame 104 when opening and closing.

Figure 2:
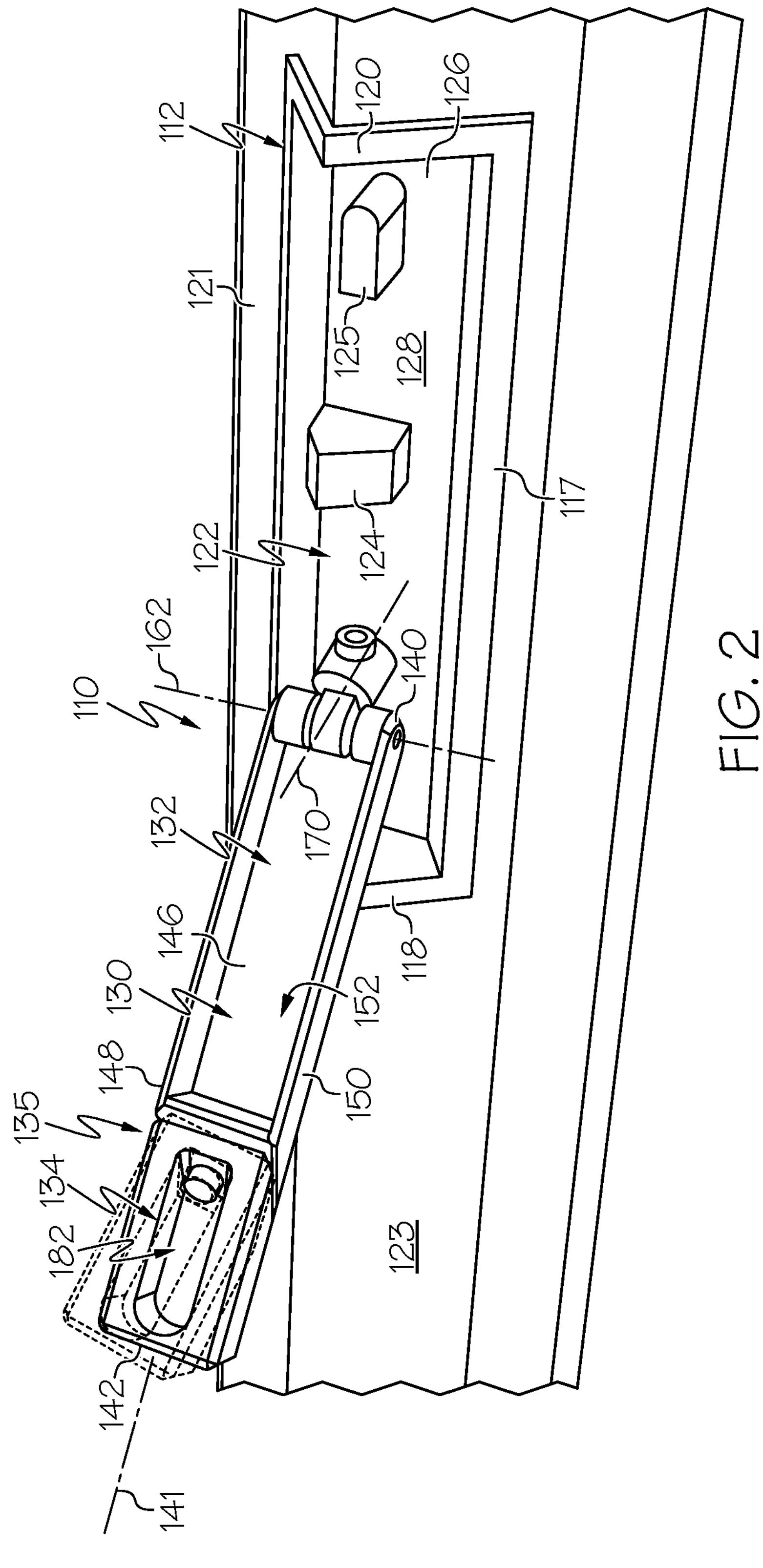
FIG. 2 is a perspective view of the crank handle assembly of FIG. 1 with the crank handle shown in a second position and with a knob of the crank handle shown in phantom moving to a third position according to example embodiments.

The fenestration unit 102 may further include a crank handle assembly 110 for manually actuating (i.e., cranking) the panel 106 between its open and closed positions. The crank handle assembly 110 may be moveably mounted to the frame 104, and various positions are illustrated in FIGS. 1 and 2 and will be discussed in detail according to example embodiments. The crank handle assembly 110 may be attached to a horizontally-running rail 108 of the frame 104. The rail 108 may be a bottom rail of the frame 104. However, it will be appreciated that the crank handle assembly 110 may be mounted in a different position without departing from the scope of the present disclosure.

In some embodiments, the crank handle assembly 110 may include an escutcheon 112, which is shown in detail in FIG. 2. The escutcheon 112 may be a shaped (e.g., angled) plate of material. The escutcheon 112 may be made from and/or may include aluminum alloy or other metal or rigid and strong polymeric material. The escutcheon 112 may be die-cast in some embodiments. The escutcheon 112 may be elongate to extend between a first end 118 and a second end 120. The escutcheon 112 may include an outer rim 117 that extends about the periphery thereof. The outer rim 117 may include a horizontal portion that lies within a horizontal plane and substantially parallel to an upper surface 121 of the rail 108. The outer rim 117 may also include a vertical portion that lies within a vertical plane and substantially parallel to a front surface 123 of the rail 108. The escutcheon 112 may be received within and inset into the rail 108 with the outer rim 117 slightly raised from the surrounding surfaces of the rail 108. As shown in FIG. 2, the escutcheon 112 may also include a front face 122 that extends between the first end 118 and the second end 120. The front face 122 may define an inset space 126 (FIG. 2) that is recessed or inset relative to the outer rim 117. Also, the front face 122 may include a seat surface 128. The seat surface 128 may be angled relative to the horizontal and vertical planes to be angled out and in an upward direction from the rail 108. Thus, the front face 122 and the seat surface 128 may face a user that is standing in front of the fenestration unit 102.

As shown in FIG. 2, the escutcheon 112 may include a first projection 124 and a second projection 125, which project outwardly from the seat surface 128. The first projection 124 and the second projection 125 may be spaced apart on the seat surface 128. The second projection 125 may be disposed proximate the second end 120, and the first projection 124 may be disposed between the second projection 125 and the first end 118.

The crank handle assembly 110 may also include a crank handle 130. The crank handle 130 is shown in detail in FIG. 3 according to example embodiments. The crank handle 130 may be elongate and may extend longitudinally along a crank handle axis 141 between a first end 140 and a second end 142. The crank handle axis 141 may be straight in some positions and/or embodiments. The crank handle 130 may also include a front face 144, a back face 146, a first longitudinal side 148, and a second longitudinal side 150. The crank handle 130 may have a generally cuboid or hexahedron-type shape, at least in the stowed and aligned position of the crank handle 130 as represented in FIG. 1.

As shown, the crank handle 130 may generally include an arm 132 (i.e., a first handle part) and a knob 134 (i.e., a second handle part). The knob 134 may be moveably attached to the arm 132 at a joint 135. Stated differently, the arm 132 and the knob 134 may collectively and/or cooperatively define the crank handle 130. The knob 134 and the arm 132 may have corresponding features, surfaces, sizes, cross sectional profiles, etc. As such, the knob 134, in at least one position, may appear flush, aligned with, and projected from the arm 132. Accordingly, the crank handle 130 may have a low profile and may be compactly stowed when not in use as will be discussed.

Figure 3:
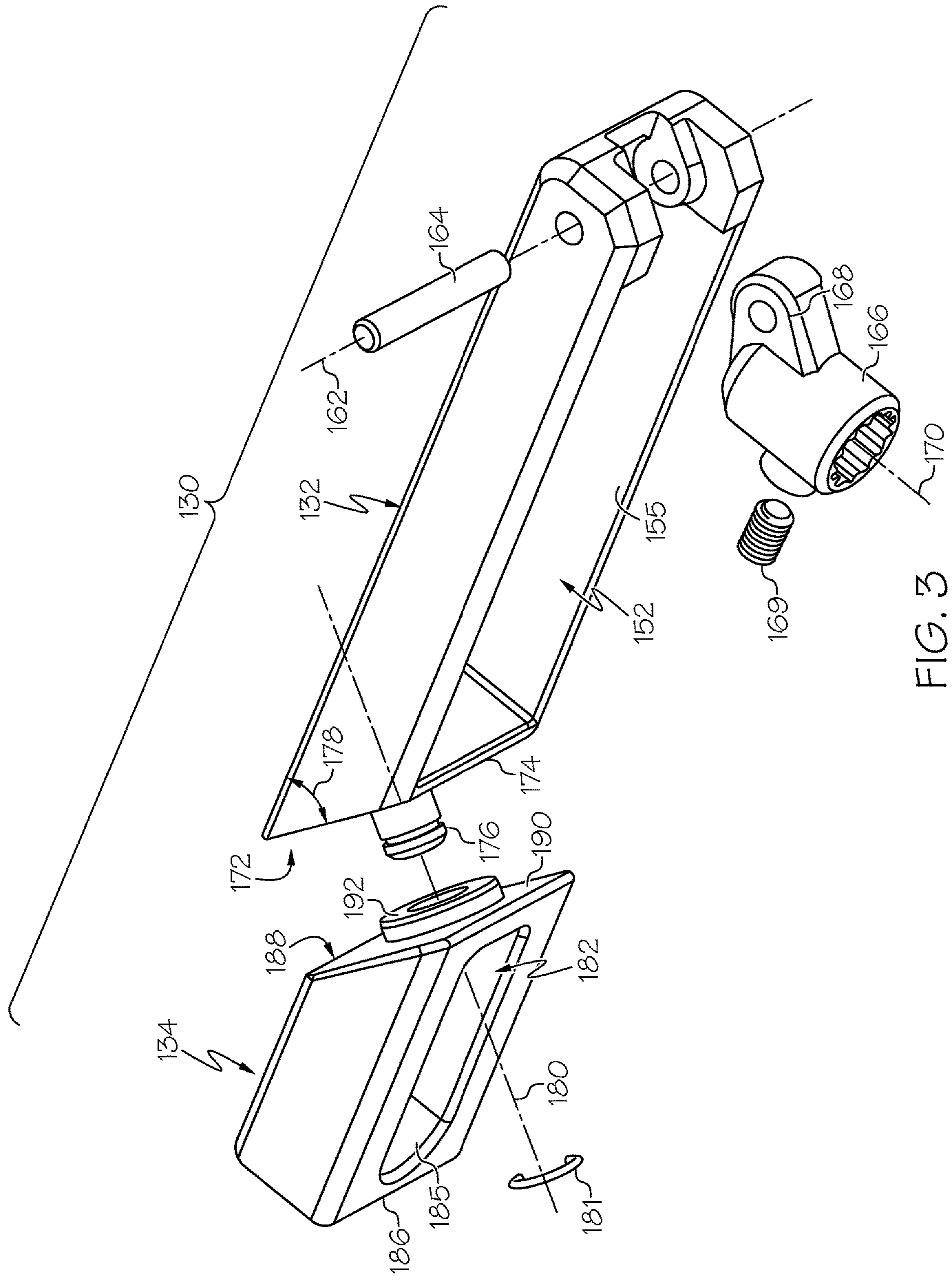
FIG. 3 is an exploded perspective view of the crank handle assembly of FIG. 1.

As shown in FIG. 3, the arm 132 may be elongate and may include a plurality of planar and flat surfaces that define respective portions of the front face 144, the first longitudinal side 148, and the second longitudinal side 150 of the crank handle 130. The arm 132, at the back face 146 of the crank handle 130, may define a hollow 152. The hollow 152 may be shaped and sized such that the majority of the arm 132 is defined by a relatively thin wall 155. An outer surface of the wall 155 may define portions of the front face 144, the first longitudinal side 148, and the second longitudinal side 150. The hollow 152 may be shaped and sized to receive the first projection 124 as will be discussed.

The arm 132 may also define parts of the first end 140 of the crank handle 130. A first arm rotational axis 162 may be defined at this end. The first arm rotational axis 162 may extend through (e.g., normal to both of) the first longitudinal side 148 and the second longitudinal side 150. A pin 164 may be included, which is coaxial with the arm rotational axis 162, and which pivotally attaches the arm 132 relative to the escutcheon 112 and the frame 104.

As shown in FIG. 3, the crank handle assembly 110 may further include a grip coupling 166 with a shoulder 168 that rotationally attaches to the crank handle 130 via the pin 164. The grip coupling 166 may also be hollow and cap-shaped and may define a second arm rotational axis 170. The grip coupling 166 may receive a knurled knob of an actuator mechanism for actuating the panel 106 between the open and closed positions. A set screw 169 may also be included for securing the grip coupling 166 to the actuator mechanism. The actuator mechanism may include a known arrangement of linkages, gearing, and/or other components for actuating the panel 106. Accordingly, rotating the crank handle 130 about the second arm rotational axis 170 may actuate the panel 106 between its open and closed positions.

At the opposite longitudinal end, the arm 132 may include a joint face 172, which may include a substantially flat surface 174 and a post 176 that projects from the surface 174. The surface 174 may be disposed at a bias angle 178 relative to the longitudinal axis of the arm 132 (i.e., relative to the crank handle axis 141). The post 176 may project out orthogonally from the flat surface 174 and may be rounded and centered about a knob rotational axis 180.

The knob 134 may have an outer profile that substantially has a hexahedron-type shape. The knob 134 may include a plurality of planar and flat surfaces that cooperate with the arm 132 to define respective portions of the front face 144, the first longitudinal side 148, and the second longitudinal side 150 of the crank handle 130. The knob 134, at the back face 146 of the crank handle 130, may define a knob hollow 182. The knob hollow 182 may be shaped and sized such that the majority of the knob 134 is defined by a relatively thin wall 185. An outer surface of the wall 185 may define portions of the front face 144, the first longitudinal side 148, and the second longitudinal side 150. The knob hollow 182 may be shaped and sized to receive the second projection 125 as will be discussed. The knob 134 may also include a terminal end surface 186, which may be flat to define the second end 142 of the crank handle 130.

Moreover, the knob 134 may include a joint face 188, which may include a substantially flat surface 190 and a raised annular collar 192 with an aperture that receives the post 176. The flat surface 190 may oppose the surface 174 of the arm 132 and may be disposed at the same bias angle 178 relative to the crank handle axis 141. A retainer ring 181 may also be included to secure the knob 134 to the post 176. Accordingly, the knob 134 may be supported for rotation (e.g., three-hundred-sixty degree rotation) about the knob rotational axis 180 relative to the arm 132. Also, when attached, the joint face 188 of the knob 134 may overlie the surface 174 of the arm 132 to cooperatively define the joint 135, and the knob 134 may project and extend from the arm 132 to define the second end 142 of the crank handle 130.

Accordingly, the knob crank handle 130 may be supported for various types of movement relative to the frame 104 and the escutcheon 112. These movements will be discussed in detail, and it will be assumed that the crank handle 130 is initially disposed in the stowed position of FIG. 1. In this stowed position, the knob 134 may be substantially aligned with the arm 132 along the crank handle axis 141, and the arm 132 may be positioned substantially flat against the seat surface 128 of the escutcheon 112. As such, the flat surfaces of the knob 134 and the corresponding flat surfaces of the arm 132 may lie substantially flush and may be substantially co-planar such that the knob 134 and the arm 132 cooperatively define the front face 144, the first longitudinal side 148, and the second longitudinal side 150 of the crank handle 130. These flat and flush surfaces are interrupted by the joint 135, but the joint is inconspicuous. Also, the first projection 124 may be received within the hollow 152 of the arm 132, and the second projection 125 may be received within the hollow 182 of the knob 134 such that the crank handle 130 is supported in this stowed position against the escutcheon 112. In some embodiments, the majority of the crank handle 130 may be disposed within the inset space 126 of the escutcheon 112. The majority of the crank handle 130 may be positioned within the outer rim 117 of the escutcheon 112 for compact stowage.

Then, the arm 132 may be manually flipped and rotated about the first arm rotational axis 162 to disengage the crank handle 130 from the escutcheon 112 and to move the crank handle 130 to the deployed position represented in FIG. 2. Next, the arm 132 may be rotated about the second arm rotational axis 170 to actuate the panel 106 toward its open or closed position. The knob 134 may rotate about the rotational axis 180 to provide grip and for providing ergonomic benefit while rotating the crank handle 130, etc. In other words, the knob 134 may move from the aligned position (shown in solid lines in FIG. 2) to a misaligned position (shown in phantom in FIG. 2). The knob 134 may move independent of the arm 132 and may have three-hundred-sixty degree freedom of rotation about the axis 180. Furthermore, the arm 132 may move independent of the escutcheon 112 and the frame 104 about the axis 170 for actuating the panel 106. When the panel 106 has been positioned, the knob 134 may be re-aligned with the arm 132, and the arm 132 may be flipped back to the stowed position represented in FIG. 1.

When stowed, the crank handle 130 may be compactly stored and may appear integrated into the frame 104. The crank handle 130 may lie flat against the seat surface 128. As shown in FIG. 1, the crank handle 130 may be disposed substantially (e.g., entirely) below the outer rim 117 and within the inset space 126 of the escutcheon 112. The outer, flat surfaces of the crank handle 130 may appear as continuous flat surfaces of the front face 122. The joint 135 between the knob 134 and the arm 132 may be inconspicuous. From this position, the crank handle 130 may be easily and conveniently deployed and actuated for moving the panel 106, and the knob 134 may rotate relative to the arm 132 to facilitate this motion.

Figure 4:
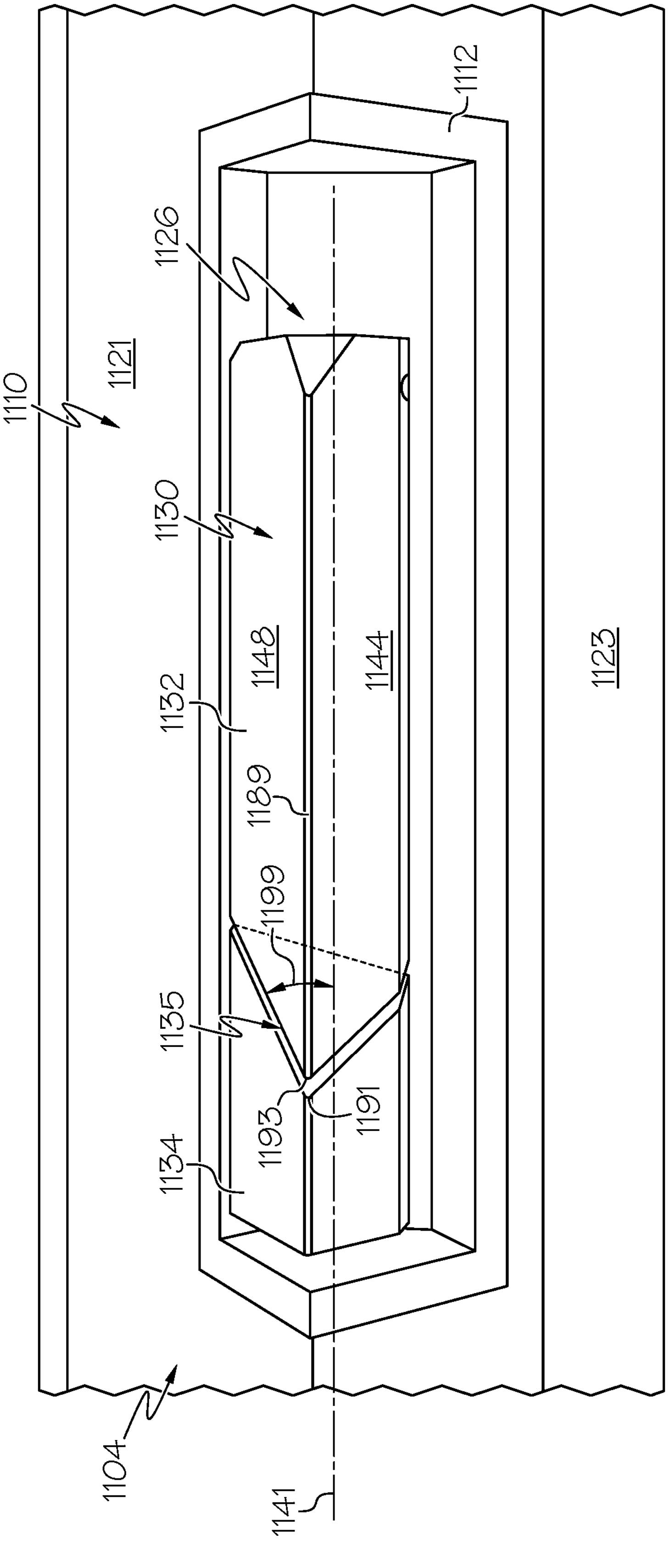
FIG. 4 is a front view of the fenestration unit with a crank handle assembly according to additional example embodiments of the present disclosure.
Figure 5:
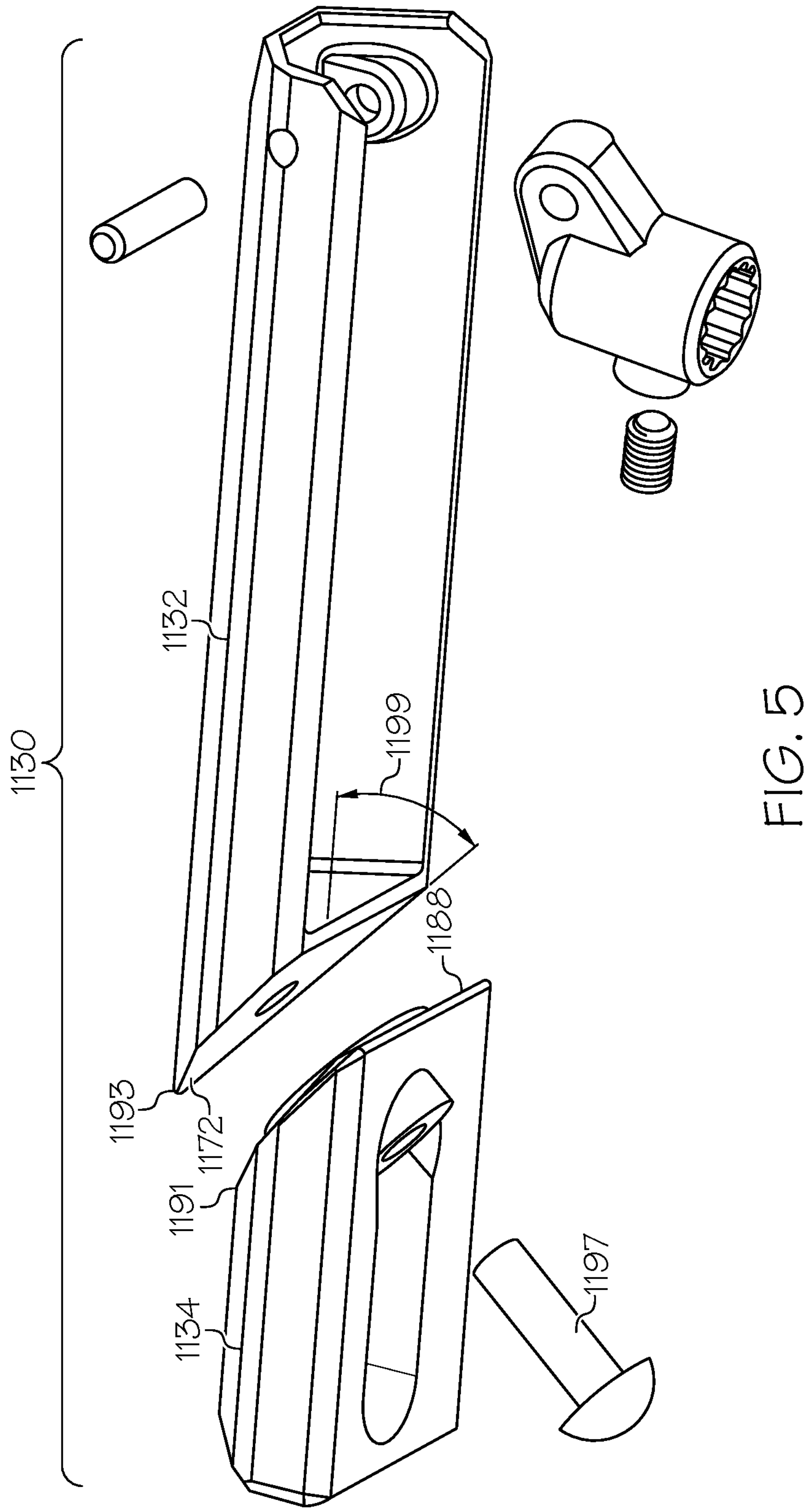
FIG. 5 is an exploded perspective view of the crank handle assembly of FIG. 4.

Referring now to FIGS. 4 and 5, additional embodiments of the crank handle assembly 1110 are illustrated according to example embodiments. The crank handle assembly 1110 may be substantially similar to the embodiments of FIGS. 1-3 except as noted. Components and features in FIGS. 4 and 5 that correspond to those of FIGS. 1-3 are indicated with corresponding reference numbers increased by 1000.

The joint 1135 connecting the knob 1134 to the arm 1132 may be configured differently. For example, the knob 1134 may be joined to the arm 1132 via a pin 1197 in some embodiments.

Also, the joint 1135 may be cooperatively defined by the joint face 1172 of the arm 1132 and the joint face 1188 of the knob 1134. These surfaces may overlap, similar to the embodiments of FIGS. 1-3. However, the joint face 1172 and the joint face 1188 may be disposed substantially along a plane set at a second bias angle 1199 relative to the longitudinal axis of the arm 1132 (i.e., relative to the crank handle axis 1141). The second bias angle 1199 may be disposed nonorthogonal to the crank handle axis 1141 and may be clocked nonorthogonally about the axis 1141 (FIG. 4).

With the knob 1134 in the aligned position with the arm 1132, the knob 1134 and arm 1132 may cooperatively define a front edge 1189 where the first longitudinal side 1148 and the front face 1144 meet. The front edge 1189 may run horizontally on the fenestration unit in some embodiments.

Due to the second bias angle 1199 of the joint 1135, the front edge 1189 may include a point 1193, for example, on the arm 1132. The front edge 1189 may also include a corresponding bevel 1191, for example, on the knob 1134. (It will be appreciated that the opposite arrangement may be included such that the knob 1134 includes the point 1193 and the arm 1132 includes the bevel 1191.) When the knob 1134 is in the aligned position with respect to the arm 1132 (FIG. 4), the point 1193 may overlap the bevel 1191 along the edge 1189. As such, the joint 1135 may be inconspicuous. The edge 1189 may appear continuous when the crank handle 1130 is stowed against the frame 1104.

Furthermore, as shown in FIG. 4, the front face 1144 may be substantially vertical and parallel to the front surface 1123 of the frame 1104. Also, the first longitudinal side 1148 may be substantially horizontal and parallel to the upper surface 1121 of the frame 1104 of the fenestration unit 1102. Accordingly, the crank handle 1130 may be stowed inconspicuously. As shown in FIG. 4, the crank handle 1130 may be received within and may substantially fill in the inset space 1126 of the escutcheon 1112. The front edge 1189 may substantially align with and/or run with corresponding edges of the frame 1104. Likewise, flat surfaces of the crank handle 1130 may substantially align with and/or run with corresponding planar surfaces of the frame 1104. Thus, the crank handle 1130 may appear highly integrated into the frame 1104. As above, the crank handle 1130 may be easily deployed and manipulated to actuate the panel of the fenestration unit. As above, the knob 1134 may rotate at the joint 1135 for ergonomic use of the crank handle 1130. And then, the knob 1134 may be re-aligned with the arm 1132, and the crank handle 1130 may be compactly stowed back against the escutcheon 1112.

Furthermore, the following examples are provided:

In an example, a crank handle assembly for actuating a panel of a fenestration unit relative to a frame is disclosed. The crank handle assembly includes an arm that is elongate and is configured to be supported at one end by the frame for rotation to actuate the moveable panel relative to the frame. The crank handle assembly also includes a knob that is moveably attached to an opposite end of the arm and that extends therefrom. The knob is supported for movement between an aligned position and a misaligned position relative to the arm. The arm and the knob cooperatively define a crank handle longitudinal axis. The knob, in the aligned position, is aligned with the arm and the crank handle longitudinal axis is straight. The knob, in the misaligned position, is misaligned with the arm, and the crank handle longitudinal axis is nonlinear.

In an option, the crank handle assembly further includes an escutcheon configured to be mounted to the frame. The escutcheon includes an inset space. The arm is supported at the one end for movement between a first position and a second position relative to the frame. The inset space is configured to receive the arm in the first position and to receive the knob in the aligned position.

In another option, the knob is configured to engage the escutcheon with the arm in the first position and the knob in the aligned position.

Furthermore, in another option, the escutcheon includes a first projection and a second projection that project outward from within the inset space. The arm is configured to receive and engage the first projection to support the arm in the first position. The knob is configured to receive and engage the second projection to support the knob in the aligned position.

Additionally, in an option, the arm and the knob are configured to lie flat against the escutcheon when the arm is in the first position and the knob is in the aligned position.

In another option, the arm has a first flat surface. Also, the knob has a second flat surface that is flush with the first flat surface when the knob is in the aligned position.

As a further option, the arm and the knob cooperatively define a crank handle with an exterior profile. The exterior profile has a substantially cuboid shape with the knob in the aligned position.

In an additional option, the knob is rotationally attached to the arm at a rotational joint. The arm and the knob, in the aligned position, cooperatively define a plurality of flat surfaces that extend along the crank handle longitudinal axis. The plurality of flat surfaces is interrupted by the joint.

Moreover, as an option, the knob is moveably attached to the arm at a joint. The knob has a knob joint face, and the arm has an arm joint face that face each other on opposite sides of the joint. The knob joint face and the arm joint face are substantially parallel to a plane. The plane is disposed at a nonorthogonal bias angle relative to the crank handle longitudinal axis.

In an additional option, the knob and the arm cooperatively define a flat surface that is interrupted by the joint. The flat surface has a first longitudinal edge. The longitudinal edge includes a point on one side of the joint and a bevel on an opposite side of the joint.

In another example, a crank handle assembly for actuating a panel of a fenestration unit relative to a frame is disclosed. The crank handle assembly includes first handle part that is elongate and axially straight and that is configured to be supported at one end by the frame for rotation about a first axis to move between a stowed position and a deployed position. The one end of the first handle part is supported for rotation about a second axis to actuate the moveable panel relative to the frame. The handle assembly further includes a second handle part that is rotationally attached to an opposite end of the first handle part at a joint. The joint supports the second handle part for rotational movement between an aligned position and a misaligned position relative to the first handle part. The first and second handle parts cooperatively define a crank handle longitudinal axis.

The second handle part, in the aligned position, is aligned with the first handle part and the crank handle longitudinal axis is straight. The second handle part, in the misaligned position, is misaligned with the first handle part and the crank handle longitudinal axis is nonlinear.

In an option, the first handle part, in the stowed position, and the second handle part, in the aligned position, are configured to lie substantially flat against the frame.

Additionally, in an option, the crank handle assembly further includes an escutcheon configured to be mounted to the frame. The escutcheon includes an inset space. The inset space is configured to receive the first handle part in the first position and to receive the second handle part in the aligned position.

In an option, the second handle part is configured to engage the escutcheon with the first handle part in the stowed position and the second handle part in the aligned position.

Furthermore, in an option, the escutcheon includes a first projection and a second projection that project outward from within the inset space. The first handle part is configured to receive and engage the first projection to support the first handle part in the first position. The second handle part is configured to receive and engage the second projection to support the second handle part in the aligned position.

In an option, the first and second handle parts cooperatively define a crank handle with an exterior profile. The exterior profile has a substantially cuboid shape with the second handle part in the aligned position.

As another option, the second handle part is moveably attached to the first handle part at a joint. The second handle part has a second joint face and the first handle part has an first joint face that face each other on opposite sides of the joint. The first and second joint faces are substantially parallel to a plane. The plane is disposed at a nonorthogonal bias angle relative to the crank handle longitudinal axis.

As another option, the first and second handle parts cooperatively define a flat surface that is interrupted by the joint. The flat surface has a first longitudinal edge. The longitudinal edge includes a point on one side of the joint and a bevel on an opposite side of the joint.

In an additional example, a fenestration unit is disclosed that includes a frame and a panel that is supported for movement relative to the frame between a closed position and an open position. The fenestration unit includes a crank handle assembly for selectively actuating the panel between the closed position and the open position. The crank handle assembly includes an arm that is elongate and that is configured to be supported at one end by the frame for rotation to actuate the moveable panel relative to the frame. The crank handle assembly also includes a knob that is moveably attached to an opposite end of the arm and that extends therefrom. The knob is supported for movement between an aligned position and a misaligned position relative to the arm. The arm and the knob cooperatively define a crank handle longitudinal axis. The knob, in the aligned position, is aligned with the arm and the crank handle longitudinal axis is straight. The knob, in the misaligned position, is misaligned with the arm and the crank handle longitudinal axis is nonlinear.

In an option, the crank handle assembly further includes an escutcheon that is inset into the frame, the escutcheon includes an inset space. The arm is supported at the one end for movement between a first position and a second position relative to the frame. The inset space is configured to receive the arm in the first position and to receive the knob in the aligned position. The arm, in the first position, and the knob, in the aligned position, are configured to lie flat against the escutcheon.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A crank handle assembly for actuating a panel of a fenestration unit relative to a frame, the crank handle assembly comprising:

an escutcheon configured to be mounted to the frame, the escutcheon including a recessed space;

an arm that is elongate and that is configured to be supported at one end by the frame for rotation to actuate the moveable panel relative to the frame, the arm supported at the one end for movement between a first position and a second position relative to the frame;

a knob that is moveably attached to an opposite end of the arm and that extends therefrom, the knob supported for movement between an aligned position and a misaligned position relative to the arm, the recessed space configured to receive the arm in the first position and to receive the knob in the aligned position;

the arm and the knob cooperatively defining a crank handle longitudinal axis;

the knob, in the aligned position, being aligned with the arm and the crank handle longitudinal axis being straight;

the knob, in the misaligned position, being misaligned with the arm and the crank handle longitudinal axis being nonlinear; and the escutcheon including a first projection and a second projection that project outward from within the recessed space, the arm configured to receive and engage the first projection to support the arm in the first position, the knob configured to receive and engage the second projection to support the knob in the aligned position.

2. The crank handle assembly of claim 1, wherein the arm and the knob are configured to lie flat against the escutcheon when the arm is in the first position and the knob is in the aligned position.

3. The crank handle assembly of claim 1, wherein the arm has a first flat surface, and wherein the knob has a second flat surface that is flush with the first flat surface when the knob is in the aligned position.

4. The crank handle assembly of claim 3, wherein the arm and the knob cooperatively define a crank handle with an exterior profile, the exterior profile having a substantially cuboid shape with the knob in the aligned position.

5. The crank handle assembly of claim 1, wherein the knob is rotationally attached to the arm at a rotational joint; and wherein the arm and the knob, in the aligned position, cooperatively define a plurality of flat surfaces that extend along the crank handle longitudinal axis, the plurality of flat surfaces interrupted by the joint.

6. The crank handle assembly of claim 1, wherein the knob is moveably attached to the arm at a joint, the knob having a knob joint face and the arm having an arm joint face that face each other on opposite sides of the joint; and wherein the knob joint face and the arm joint face are substantially parallel to a plane, the plane disposed at a nonorthogonal bias angle relative to the crank handle longitudinal axis.

7. The crank handle assembly of claim 6, wherein the knob and the arm cooperatively define a flat surface that is interrupted by the joint, the flat surface having a first longitudinal edge; and wherein the longitudinal edge includes a point on one side of the joint and a bevel on an opposite side of the joint.

8. A crank handle assembly for actuating a panel of a fenestration unit relative to a frame, the crank handle assembly comprising:

an escutcheon configured to be mounted to the frame, the escutcheon including a recessed space;

a first handle part that is elongate and axially straight and that is configured to be supported at a first end by the frame for rotation about a first axis to move between a stowed position and a deployed position, the first end of the first handle part supported for rotation about a second axis to actuate the moveable panel relative to the frame;

a second handle part that is rotationally attached to an opposite end of the first handle part at a joint, the opposite end being opposite to the first end, the joint supporting the second handle part for rotational movement between an aligned position and a misaligned position relative to the first handle part, the recessed space configured to receive the first handle part in the stowed position and to receive the second handle part in the aligned position;

the first and second handle parts cooperatively defining a crank handle longitudinal axis;

the second handle part, in the aligned position, being aligned with the first handle part and the crank handle longitudinal axis being straight;

the second handle part, in the misaligned position, being misaligned with the first handle part and the crank handle longitudinal axis being nonlinear; and the escutcheon including a first projection and a second projection that project outward from within the recessed space, the first handle part configured to receive and engage the first projection to support the first handle part in the first position, the second handle part configured to receive and engage the second projection to support the second handle part in the aligned position.

9. The crank handle assembly of claim 8, wherein the first handle part, in the stowed position, and the second handle part, in the aligned position, are configured to lie substantially flat against the frame.

10. The crank handle assembly of claim 8, wherein the first and second handle parts cooperatively define a crank handle with an exterior profile, the exterior profile having a substantially cuboid shape with the second handle part in the aligned position.

11. The crank handle assembly of claim 8, wherein the second handle part is moveably attached to the first handle part at a joint, the second handle part having a second joint face and the first handle part having a first joint face that face each other on opposite sides of the joint; and wherein the first and second joint faces are substantially parallel to a plane, the plane disposed at a nonorthogonal bias angle relative to the crank handle longitudinal axis.

12. The crank handle assembly of claim 11, wherein the first and second handle parts cooperatively define a flat surface that is interrupted by the joint, the flat surface having a first longitudinal edge; and wherein the longitudinal edge includes a point on one side of the joint and a bevel on an opposite side of the joint.

13. A fenestration unit comprising:

a frame;

a panel that is supported for movement relative to the frame between a closed position and an open position;

a crank handle assembly for selectively actuating the panel between the closed position and the open position, the crank handle assembly comprising:

an escutcheon that is mounted to the frame and received into the frame, the escutcheon including an outer rim, the escutcheon including a front face with a recessed space that is recessed relative to the outer rim;

an arm that is elongate and that is configured to be supported at one end, within the recessed space, by the frame for rotation to actuate the moveable panel relative to the frame;

a knob that is moveably attached to an opposite end of the arm and that extends therefrom, the knob supported for movement between an aligned position and a misaligned position relative to the arm;

the arm and the knob cooperatively defining a crank handle longitudinal axis;

the knob, in the aligned position, being aligned with the arm and the crank handle longitudinal axis being straight; and the knob, in the misaligned position, being misaligned with the arm and the crank handle longitudinal axis being nonlinear.

14. The fenestration unit of claim 13, wherein the arm is supported at the one end for movement between a first position and a second position relative to the frame;

wherein the recessed space is configured to receive the arm in the first position and to receive the knob in the aligned position; and wherein the arm, in the first position, and the knob, in the aligned position, are configured to lie flat against the escutcheon.

15. The fenestration unit of claim 13, wherein the frame includes a rail, and wherein the escutcheon is received in the rail.

16. The fenestration unit of claim 13, wherein the outer rim defines a first surface and a second surface that are flat, the first surface and the second surface being perpendicular to the other, the front face being angled at a non-perpendicular angle to the first surface and the second surface.

17. The fenestration unit of claim 16, wherein the knob is rotationally attached to the arm at a rotational joint; and wherein the arm and the knob, in the aligned position, cooperatively define a plurality of flat surfaces that extend along the crank handle longitudinal axis, the plurality of flat surfaces interrupted by the joint.

18. The fenestration unit of claim 17, wherein the plurality of flat surfaces, in the aligned position, are substantially parallel to the front face.

19. The fenestration unit of claim 17, wherein the plurality of flat surfaces, in the aligned position, are substantially parallel to the first surface.

* * * * *